US007069119B2

(12) United States Patent
Ueda et al.

(10) Patent No.: US 7,069,119 B2
(45) Date of Patent: Jun. 27, 2006

(54) REMOTE CONTROL DEVICE FOR VEHICLES

(75) Inventors: Shinichi Ueda, Tochigi-ken (JP); Shinichi Arie, Saitama (JP); Kentaro Yoshimura, Tochigi-ken (JP); Suguru Asakura, Utsunomiya (JP); Akira Kamikura, Utsunomiya (JP); Kenichi Sawada, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/679,284

(22) Filed: Oct. 7, 2003

(65) Prior Publication Data

US 2004/0073340 A1 Apr. 15, 2004

(30) Foreign Application Priority Data

Oct. 9, 2002 (JP) ............................ 2002-296085

(51) Int. Cl.
*G06F 7/00* (2006.01)

(52) U.S. Cl. ............................ 701/2; 701/34; 701/36; 340/426.13; 340/426.15; 340/426.36; 180/287; 307/10.2

(58) Field of Classification Search ........... 340/426.15, 340/426.16, 426.28, 426.36, 426.1, 5.61, 340/5.6, 426.13; 701/2, 34, 36; 307/10.2, 307/10.5; 180/287
See application file for complete search history.

(56) References Cited

U.S. PATENT DOCUMENTS

| | | | | |
|---|---|---|---|---|
| 4,674,454 A * | 6/1987 | Phairr | ..................... | 123/179.2 |
| 5,552,641 A * | 9/1996 | Fischer et al. | ............. | 307/10.5 |
| 5,684,337 A * | 11/1997 | Wallace | ...................... | 307/10.2 |
| 5,850,188 A * | 12/1998 | Doyle et al. | ........... | 340/825.69 |
| 5,896,094 A * | 4/1999 | Narisada et al. | ........... | 340/5.64 |
| 5,907,287 A * | 5/1999 | Sakagami et al. | ......... | 340/5.54 |
| 5,982,292 A * | 11/1999 | Tagawa et al. | ............ | 340/5.64 |
| 6,140,938 A * | 10/2000 | Flick | ...................... | 340/825.69 |
| 6,181,254 B1 * | 1/2001 | Vogele | .................. | 340/825.69 |
| 6,538,559 B1 | 3/2003 | Okada | | |
| 6,700,476 B1 * | 3/2004 | Okada et al. | ............. | 340/5.62 |

FOREIGN PATENT DOCUMENTS

| | | |
|---|---|---|
| DE | 102 58 760 A1 | 12/2001 |
| EP | 0 985 789 A2 | 3/2000 |
| EP | 1 237 385 | 9/2002 |
| JP | 5-2791 | 1/1993 |
| JP | 11-336395 | 12/1999 |
| JP | 2000-85532 | 3/2000 |
| JP | 2001-73604 | 3/2001 |
| JP | 2002-168018 | 6/2002 |
| JP | 2002-257690 | 9/2002 |

* cited by examiner

*Primary Examiner*—Thomas G. Black
*Assistant Examiner*—Eric M. Gibson
(74) *Attorney, Agent, or Firm*—Arent Fox PLLC

(57) ABSTRACT

A request signal transmitted from LF antennas of a vehicle-mounted unit is received by a radio terminal through an LF antenna. In response to the request signal, the radio terminal transmits a response signal from an antenna. The response signal is received by an RF unit of the vehicle-mounted unit. The vehicular remote control device controls an operating state of a vehicle-mounted device depending on the judgment of a match between the response signal and identification information inherent in the vehicle. The radio terminal has a light-emitting diode. When the radio terminal receives a failure diagnosis signal that is transmitted instead of the request signal, the radio terminal does not transmit a response signal, but energizes the light-emitting diode.

12 Claims, 10 Drawing Sheets

REMOTE CONTROL DEVICE FOR VEHICLES

BACKGROUND OF THE INVENTION

1. Field of the Invention

The present invention relates to a remote control device for vehicles, and more particularly to a vehicular remote control device for checking a code based on communications with a remote controller and controlling operation of vehicle-mounted devices based on the checking results. More specifically, the present invention relates to a vehicular remote control device suitable for use as a vehicle door lock remote control device.

2. Description of the Related Art

Heretofore, it has been necessary to occasionally diagnose the failure of a vehicular remote control device which controls vehicle-mounted devices. Such a vehicular remote control device is basically made up of a vehicle-mounted unit and a portable unit.

If a conventional vehicular remote control device comprises a vehicle door lock control device, then it is diagnosed for failures according to the following process: When the vehicle door lock control device is normal, the portable unit is in contact with a loop antenna mounted on a vehicle body, and radiates a radio wave which is received by the loop antenna. A reference value Rs which corresponds to the intensity of the radio wave that is detected by the loop antenna is predetermined. The reference value Rs is stored in a memory of the vehicle-mounted unit.

When an ignition key is pulled out of the ignition key cylinder in the vehicle, the vehicle-mounted unit sends a request signal to the portable unit. In response to the request signal, the portable unit sends a key code signal to the vehicle-mounted unit. At this time, the vehicle-mounted unit measures the received intensity Rf of the key code signal sent from the portable unit.

When the vehicle-mounted unit detects that a key code sent from the portable unit and a key code stored in the memory of the vehicle-mounted unit agree with each other, then the vehicle-mounted unit performs a door locking/unlocking process. In other words, the vehicle-mounted unit unlocks the vehicle doors if the vehicle doors are locked, or locks the vehicle doors if the vehicle doors are unlocked. Then, the vehicle-mounted unit checks if the received intensity Rf is greater than or equal to the reference value Rs. If the received intensity Rf is greater than or equal to the reference value Rs, then the vehicle-mounted unit judges that the vehicle door lock control device is normal. If not, then the vehicle-mounted unit judges that the vehicle door lock control device is malfunctioning.

When the vehicle-mounted unit sends a request signal to the portable unit while the portable unit is in contact with the loop antenna, if the vehicle-mounted unit does not detect the condition that the received intensity Rf is greater than or equal to the reference value Rs, then the portable unit judges the possibility of a failure of its own antenna, or the generation of an abnormal carrier frequency, or deterioration of its power supply voltage. Alternatively, the vehicle-mounted unit judges that the loop antenna on the vehicle body may possibly be malfunctioning. See Japanese patent publication No. 5-2791, for example, for details.

Another failure diagnosis process for the conventional vehicular remote control device will be described below. When the failure diagnosis routine starts, the vehicle-mounted unit sends a request signal from a transmission antenna that is positioned near the grip handle of a door on the side of the driver's seat. In response to the request signal from the vehicle-mounted unit, the portable unit sends a radio-frequency return signal to the vehicle-mounted unit. The vehicle-mounted unit receives the return signal with a reception antenna, demodulates the return signal, determines whether a code contained in the return signal and a code stored in the memory of the vehicle-mounted unit agree with each other, and produces a response sound from a buzzer of the vehicle-mounted unit when the codes agree with each other. Then, the user presses a door unlock switch on the portable unit to send a code corresponding to the unlocking of the door from the portable unit. The code is received by the reception antenna of the vehicle-mounted unit, which demodulates the code. When the code is demodulated, the vehicle-mounted unit sends a request signal from another antenna, e.g., a transmission antenna that is positioned near the grip handle of a door on the side of the assistant driver's seat, after which the above process is carried out. While the above request signals are being repeatedly transmitted, the user places the portable unit within the detection range of the transmission antennas, i.e., the range in which the portable unit can receive signals with its reception antenna. This is to confirm a response sound for thereby determining whether the portable unit itself suffers a failure, the transmission antenna and transmitter of the portable unit or the vehicle-mounted unit are malfunctioning, or the reception antenna and receiver of the portable unit or the vehicle-mounted unit are malfunctioning. Reference should be made to Japanese laid-open patent publication No. 2000-85532, for example, for details.

The conventional vehicular remote control device is problematic in that since the portable unit needs to have its transmitter and receiver circuits kept in operation even during the failure diagnosis, the portable unit requires large power consumption in transmitting and receiving radio waves. Incidentally, the portable unit consumes more power when transmitting radio waves than when receiving radio waves, and because the portable unit is battery-powered, the life of its battery and therefore the life of the portable unit itself is shortened.

Another problem of the conventional vehicular remote control device is that the failure diagnosis can detect a malfunction, but it may be difficult to specify the location where the malfunction has occurred.

If the failure diagnosis is carried out on the basis of comparing the level of received signals, then the results of the failure diagnosis may not necessarily be accurate due to noise added to the signals.

SUMMARY OF THE INVENTION

It is a major object of the present invention to provide a vehicular remote control device which can reduce the power consumption of a portable unit.

Another object of the present invention is to provide a vehicular remote control device which easily specifies the location of a failure in the vehicular remote control device.

Still another object of the present invention is to provide a vehicular remote control device with a simple arrangement for diagnosing failures.

Yet another object of the present invention is to provide a vehicular remote control device which is capable of reducing a power consumption thereof at the time of a failure diagnosis of the vehicular remote control device.

According to an aspect of the present invention, there is provided a vehicular remote control device comprising vehicular transmitter for transmitting a request signal, a portable unit for transmitting a response signal in response to the request signal transmitted thereto from the vehicular transmitter, vehicular receiver for receiving the response signal, and control means for determining whether the response signal received by the vehicular receiver matches identification information stored in a vehicle or not, and controlling an operating state of a vehicle-mounted device depending on the determined result, the portable unit having indicating means for indicating a failure status and decision means for determining the reception of a failure diagnosis signal transmitted to the portable unit instead of the request signal. The indicating means is operated when the decision means determines the reception of the failure diagnosis signal.

With the above vehicular remote control device, when a failure diagnosis signal is transmitted, instead of the request signal, from the vehicular transmitter to the portable unit, the decision means determines the reception of the failure diagnosis signal, and operates the indicating means based on the determined reception of the failure diagnosis signal for a failure diagnosis. At this time, since the portable unit operates the indicating means only, and does not transmit the response signal, the power consumption of the portable unit is relatively low. In addition, the user of the portable unit can determine whether a failure has occurred or not based on merely whether the indicating means has operated or not. Thus, a failure diagnosis can readily be performed on the vehicular remote control device.

According to another aspect of the present invention, there is provided a vehicular remote control device comprising vehicular transmitter for transmitting a request signal, a portable unit for transmitting a response signal in response to the request signal transmitted thereto from the vehicular transmitter, vehicular receiver for receiving the response signal, control means for determining whether the response signal received by the vehicular receiver matches identification information stored in a vehicle or not, and controlling an operating state of a vehicle-mounted device depending on the determined result, and failure diagnosis means disposed in the vehicle for controlling the portable unit to diagnose the vehicular transmitter for failures by means of transmitting a failure diagnosis signal instead of the request signal from the vehicular transmitter, the portable unit having indicating means for indicating a failure status and means for operating the indicating means in response to the failure diagnosis signal.

With the above vehicular remote control device, when a failure diagnosis signal is transmitted, instead of the request signal, from the vehicular transmitter to the portable unit, the portable unit diagnoses the vehicular transmitter for failures. In response to the failure diagnosis signal, the indicating means is operated for a failure diagnosis. At this time, since the portable unit operates the indicating means only, and does not transmit the response signal, the power consumption of the portable unit is relatively low. In addition, the user of the portable unit can determine whether a failure has occurred or not based on merely whether the indicating means has operated or not. Thus, a failure diagnosis can readily be performed on the vehicular remote control device.

The vehicular remote control device does not perform a failure diagnosis based on the comparison of signal levels, and hence its accurate diagnosis is not obstructed by noise.

According to the failure diagnosis process for the conventional vehicular remote control device (see Japanese laid-open patent publication No. 2000-85532), components to be diagnosed for failures include transmitters and receivers on a vehicle and a transmitter and a receiver on a portable unit. According to the present invention, components to be diagnosed for failures include the vehicular transmitter and a receiver on the portable unit. As locations diagnosed for failures are narrowed down, it is easy to specify the location of a failure, and the cause of a failure can be analyzed accurately. When the indicating means does not indicate a failure, the portable unit is replaced with another one. If the substitute portable unit does not indicate a failure either, then it can be determined that the vehicular transmitter is malfunctioning. According to the failure diagnosis process for the conventional vehicular remote control device as disclosed in Japanese laid-open patent publication No. 2000-85532, even when a buzzer of the substitute portable unit is not turned on, vehicular transmitters or vehicular receivers may possibly be malfunctioning, so that a failure cannot easily be spotted. The vehicular remote control device according to the present invention, however, makes it easy to specify the location of a failure.

With the conventional vehicular remote control device, a failure diagnosis is carried out based on a request signal and a response signal. Consequently, a portable unit that can be used for a failure diagnosis is limited to a portable unit whose response signal matches the vehicle, i.e., a portable unit which has been registered and permitted for use with respect to the vehicle. Therefore, if only one portable unit is permitted for use with respect to the vehicle, then no substitute portable units are available, and it would not be easy to determine whether a failure has occurred on the portable unit or not. It is thus very difficult to determine a failure of the vehicular transmitter which is diagnosed for failures.

In the vehicular remote control device according to the present invention, the failure diagnosis signal to be transmitted to the portable unit may comprise a common signal used in any type of vehicles. The use of the common signal allows any portable units to be used for a failure diagnosis. It can easily determine whether a failure has occurred on the receiver on the portable unit or the vehicular transmitter, simply by replacing the portable unit. Thus, a failure diagnosis process can be simplified.

According to still another aspect of the present invention, there is also provided a portable unit for use in a vehicular remote control device, comprising an LF receiver circuit for receiving a request signal having a low frequency which is transmitted from a vehicle, an RF transmitter circuit responsive to the request signal, for transmitting a response signal having a radio frequency which includes identification information for controlling an operating state of a vehicle-mounted device on the vehicle, decision means for determining whether a failure diagnosis signal having a low frequency which is transmitted instead of the request signal is received by the LF receiver circuit or not, and indicating means for indicating a failure status, the decision means operates the indicating means when it is judged by the decision means that the failure diagnosis signal is received by the LF receiver circuit.

According to the present invention, since the RF transmitter circuit is not operated for a failure diagnosis, the power consumption of the portable unit is relatively low. If the indicating means comprises an LED, the failure diagnosis signal functioning substantially as a command signal for energizing the LED.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
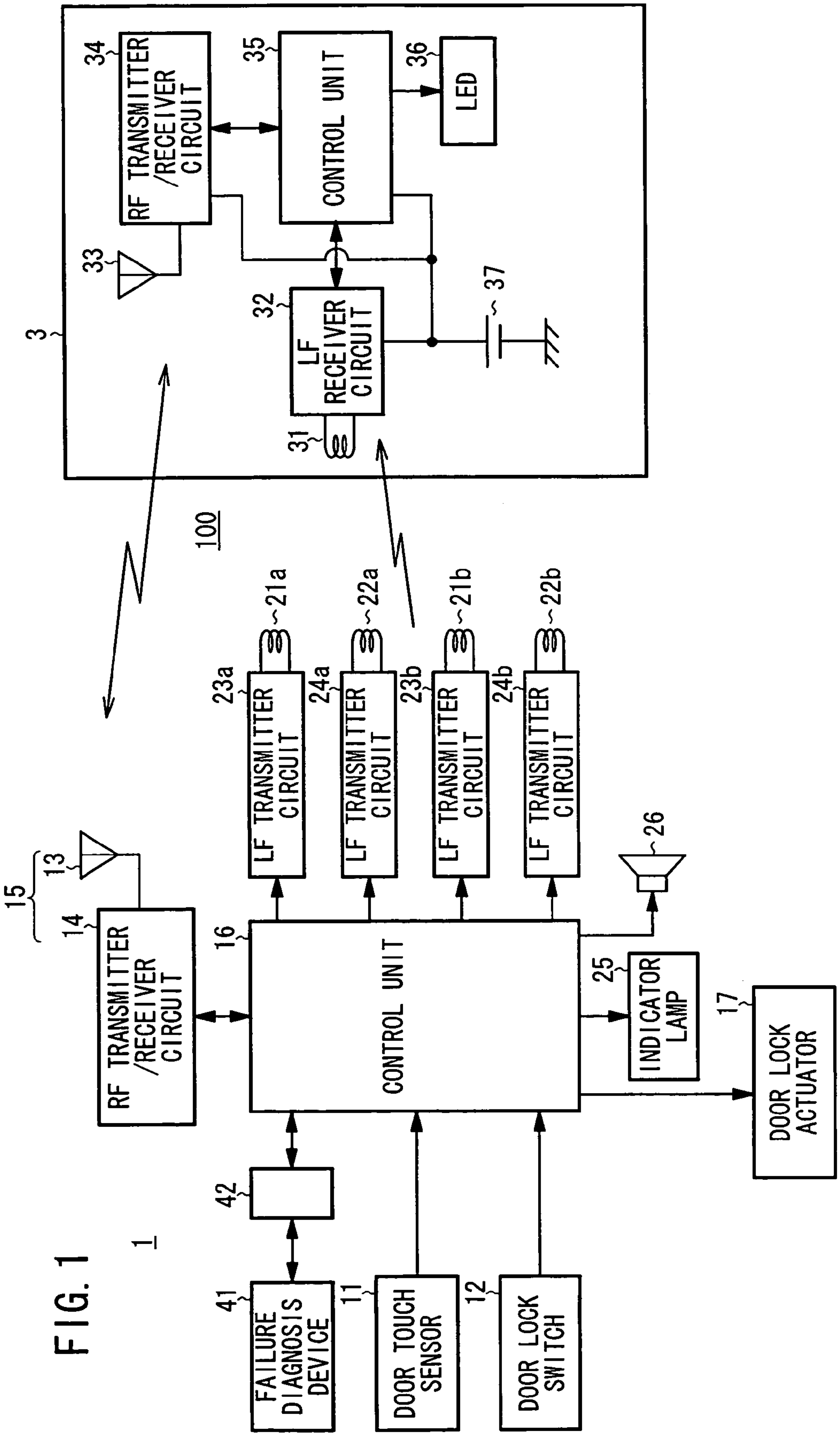
FIG. 1 is a block diagram of a vehicular remote control device according to an embodiment of the present invention.
Figure 2:
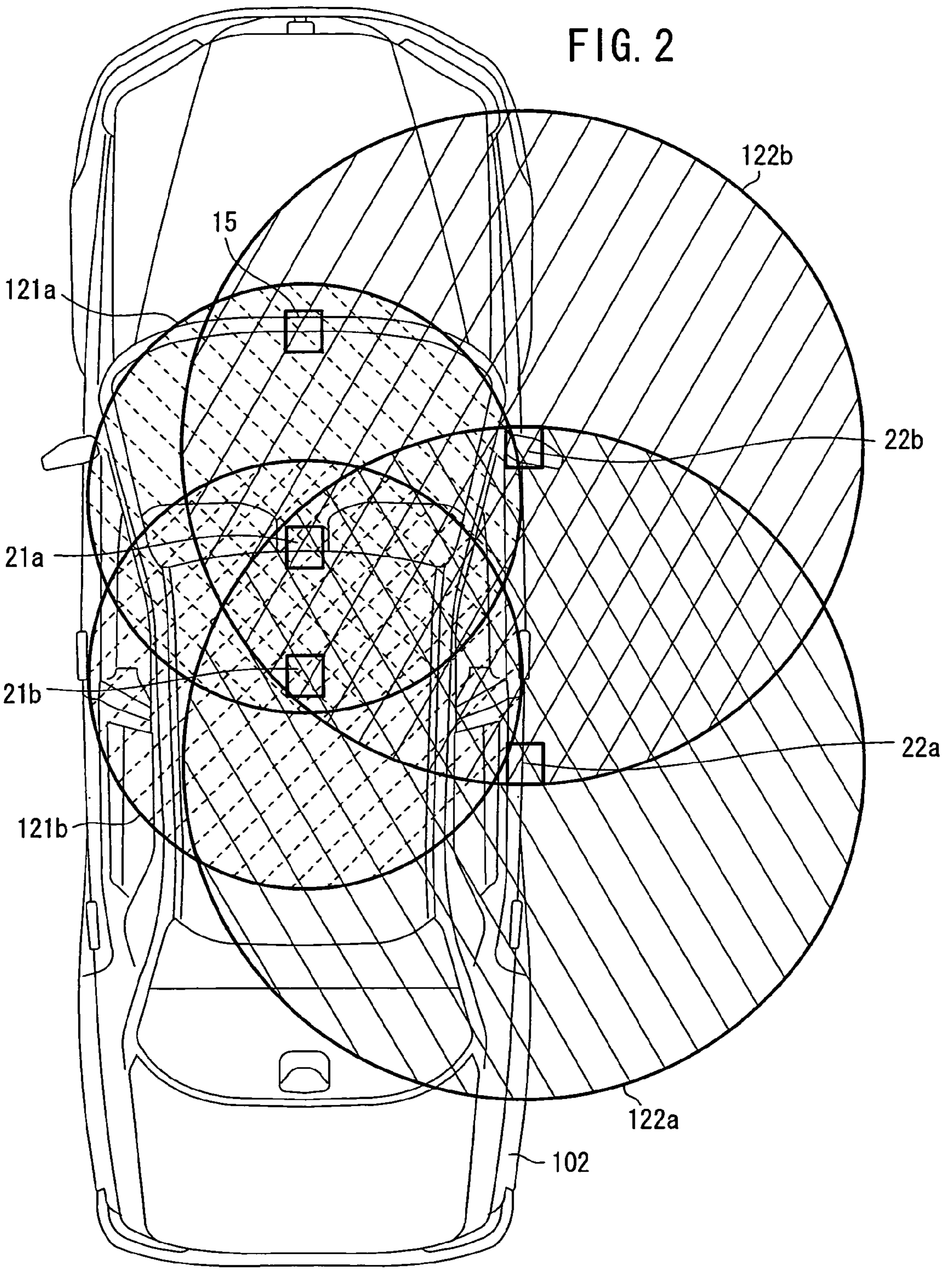
FIG. 2 is a plan view illustrative of effective transmission ranges of LF (Low Frequency) antennas of the vehicular remote control device.

As shown in FIGS. 1 and 2, a vehicular remote control device 100 according to an embodiment of the present invention generally comprises a vehicle-mounted unit 1 mounted on a vehicle 102 and a radio terminal (also referred to as a portable unit) 3 which is carried by the user of the vehicle 102 and powered by a primary battery for performing radio communications with the vehicle-mounted unit 1.

The vehicle-mounted unit 1 has a door touch sensor 11 having a capacitance sensor for detecting when the grip handle of a door of the vehicle is touched by hand at the time the door is unlocked, and a door lock switch 12 such as a pushbutton switch which is manually operated to lock the door.

The vehicle-mounted unit 1 also has an RF (Radio Frequency) unit 15 comprising an RF antenna 13 mounted as a transmission/reception antenna on a face or reverse side of the instrumental panel of the vehicle 102, and an RF transmitter/receiver circuit 14 for transmitting and receiving signals through the RF antenna 13. The RF unit 15 transmits a transmission signal having a radio frequency (315 MHz in the present embodiment) through the RF antenna 13, and receives a transmission signal having a radio frequency which is transmitted from an RF antenna 33, as a transmission/reception antenna, of the radio terminal 3, also through the RF antenna 13. In this manner, the RF unit 15 communicates with the radio terminal 3 with signals having a radio frequency.

The vehicle-mounted unit 1 further includes an intravehicular LF (Low Frequency) antenna 21*a* mounted on a central vehicle floor of front seats of the vehicle, an intravehicular LF antenna 21*b* mounted on a central vehicle floor of rear seats of the vehicle, an extravehicular LF antenna 22*a* mounted on an outer vehicle surface at the rear seats of the vehicle 102, and an extravehicular LF antenna 22*b* mounted on a reverse side of a rearview door mirror on an outer vehicle surface. The vehicle-mounted unit 1 also includes LF transmitter circuits 23*a*, 23*b*, 24*a*, 24*b* connected respectively to the intravehicular LF antenna 21*a*, the intravehicular LF antenna 21*b*, the extravehicular LF antenna 22*a*, and the extravehicular LF antenna 22*b*. Transmission signals having a low frequency (125 kHz in the present embodiment) which are supplied from the LF transmitter circuits 23*a*, 23*b*, 24*a*, 24*b* are transmitted respectively through the intravehicular LF antenna 21*a*, the intravehicular LF antenna 21*b*, the extravehicular LF antenna 22*a*, and the extravehicular LF antenna 22*b* to the radio terminal 3. The transmission signals transmitted from the intravehicular LF antenna 21*a*, the intravehicular LF antenna 21*b*, the extravehicular LF antenna 22*a*, and the extravehicular LF antenna 22*b* are received by an LF receiver circuit 32 of the radio terminal 3 through an LF antenna 31 connected to the LF receiver circuit 32.

The vehicle-mounted unit 1 communicates with the radio terminal 3 using signals having a low frequency (hereinafter referred to as "LF signals") in order to communicate with the radio terminal 3 which is present in respective effective transmission ranges 121*a*, 121*b*, 122*a*, 122*b* of the intravehicular LF antenna 21*a*, the intravehicular LF antenna 21*b*, the extravehicular LF antenna 22*a*, and the extravehicular LF antenna 22*b*. The vehicle-mounted unit 1 communicates with the radio terminal 3 using a signal having a radio frequency (hereinafter referred to as "RF signal") in order to communicate with the radio terminal 3 for transmitting a relatively large amount of information at a high speed within a circular range having a diameter of 5 m around the RF antenna 13 (the RF unit 15) of the vehicle-mounted unit 1.

As indicated by the broken hatched lines in FIG. 2, the effective transmission ranges 121*a*, 121*b* of the intravehicular LF antenna 21*a* and the intravehicular LF antenna 21*b* are limited within the passenger compartment of the vehicle 102 by outer panels of the vehicle. As indicated by the solid hatched lines in FIG. 2, the effective transmission ranges 122*a*, 122*b* of the extravehicular LF antenna 22*a* and the extravehicular LF antenna 22*b* are limited within circular spaces respectively around the extravehicular LF antenna 22*a* and the extravehicular LF antenna 22*b*, each circular space having a diameter which is substantially equal to the arm's length of the driver, e.g., a diameter of about 1 m.

The vehicle-mounted unit 1 has a control unit 16 comprising a CPU including a memory. The control unit 16 is supplied with an output signal from the door touch sensor 11, an output signal from the door lock switch 12, an output signal from a failure diagnosis device 41 which is connected to the control unit 16 by a connector 42 and selects and specifies any one of the LF antennas 21*a*, 21*b*, 22*a*, 22*b*, and an output signal from a vehicle speed sensor (not shown). The control unit 16 processes the supplied output signals as follows:

The control unit 16 carries out a door sensor signal input processing sequence to energize a door lock actuator 17 of the vehicle-mounted unit 1 to unlock doors of the vehicle 102 by communicating with the radio terminal 3 with an LF signal and an RF signal based on the output signal from the door touch sensor 11. The control unit 16 carries out a door lock switch processing sequence to energize the door lock actuator 17 to lock the doors of the vehicle 102 by communicating with the radio terminal 3 with an LF signal and an RF signal based on the output signal from the door lock switch 12. The control unit 16 carries out a failure diagnosis processing sequence to diagnose the vehicle-mounted unit 1 and/or the radio terminal 3 by communicating with the radio terminal 3 with an LF signal based on the output signal from the failure diagnosis device 41.

Furthermore, the control unit 16 has a function to energize an indicator lamp 25 comprising a hazard lamp and an answer-back buzzer 26 for indicating certain states that need to be announced to the user.

The radio terminal 3 comprises an LF antenna 31, an LF receiver circuit 32 for receiving through the LF antenna 31 LF signals that are transmitted from the intravehicular LF antenna 21*a*, the intravehicular LF antenna 21*b*, the extravehicular LF antenna 22*a*, and the extravehicular LF antenna 22*b*, an RF antenna 33, an RF transmitter/receiver circuit 34 for transmitting an RF signal to and receiving an RF signal from the RF unit 15 of the vehicle-mounted unit 1 through the RF antenna 33, a light-emitting diode (LED) 36 which is energized when a failure diagnosis is carried out, and a control unit 35 for controlling the LF receiver circuit 32, the RF transmitter/receiver circuit 34, and the LED 36, the control unit 35 comprising a CPU including a memory. Operation of the RF transmitter/receiver circuit 34 and the control unit 35 are started in response to a startup signal which is received by and output from the LF receiver circuit 32. When the control unit 35 receives an LF signal supplied as a request signal from the LF antenna 31, the control unit 35 controls the RF transmitter/receiver circuit 34 to transmit an identification signal through the RF antenna 33. The control unit 35 also receives a cryptographic code signal having a radio frequency, which may represent a random number, transmitted from the RF unit 15 on the vehicle 102, issues a cryptographic calculation result signal having a radio frequency based on the received cryptographic code signal, and energizes the LED 36 when it receives a failure diagnosis signal which acts as a command signal for energizing the LED 36.

The radio terminal 3, i.e., the LF receiver circuit 32, the RF transmitter/receiver circuit 34, and the control unit 35, are energized by electric power from a primary battery 37 which is removably accommodated in the radio terminal 3. The primary battery 37 may be replaced with a secondary battery or another electric charge storage means.

Various means which will be referred to in the present invention are defined as follows: A vehicular transmitter corresponds to the intravehicular. LF antenna 21*a* and the LF transmitter circuit 23*a*, the intravehicular LF antenna 21*b* and the LF transmitter circuit 23*b*, the extravehicular LF antenna 22*a* and the LF transmitter circuit 24*a*, and the extravehicular LF antenna 22*b* and the LF transmitter circuit 24*b*. A portable unit corresponds to the radio terminal 3. A control means corresponds to the control unit 16. The RF antenna 33 and the RF transmitter/receiver circuit 34 in the radio terminal 3 transmit a response signal in response to a request signal from the vehicular transmitter. A vehicular receiver corresponds to the RF unit 15. An indicating means corresponds to the LED 36. A decision means corresponds to a decision step provided as step S308 (see FIG. 7) to be described later on.

Figure 3:
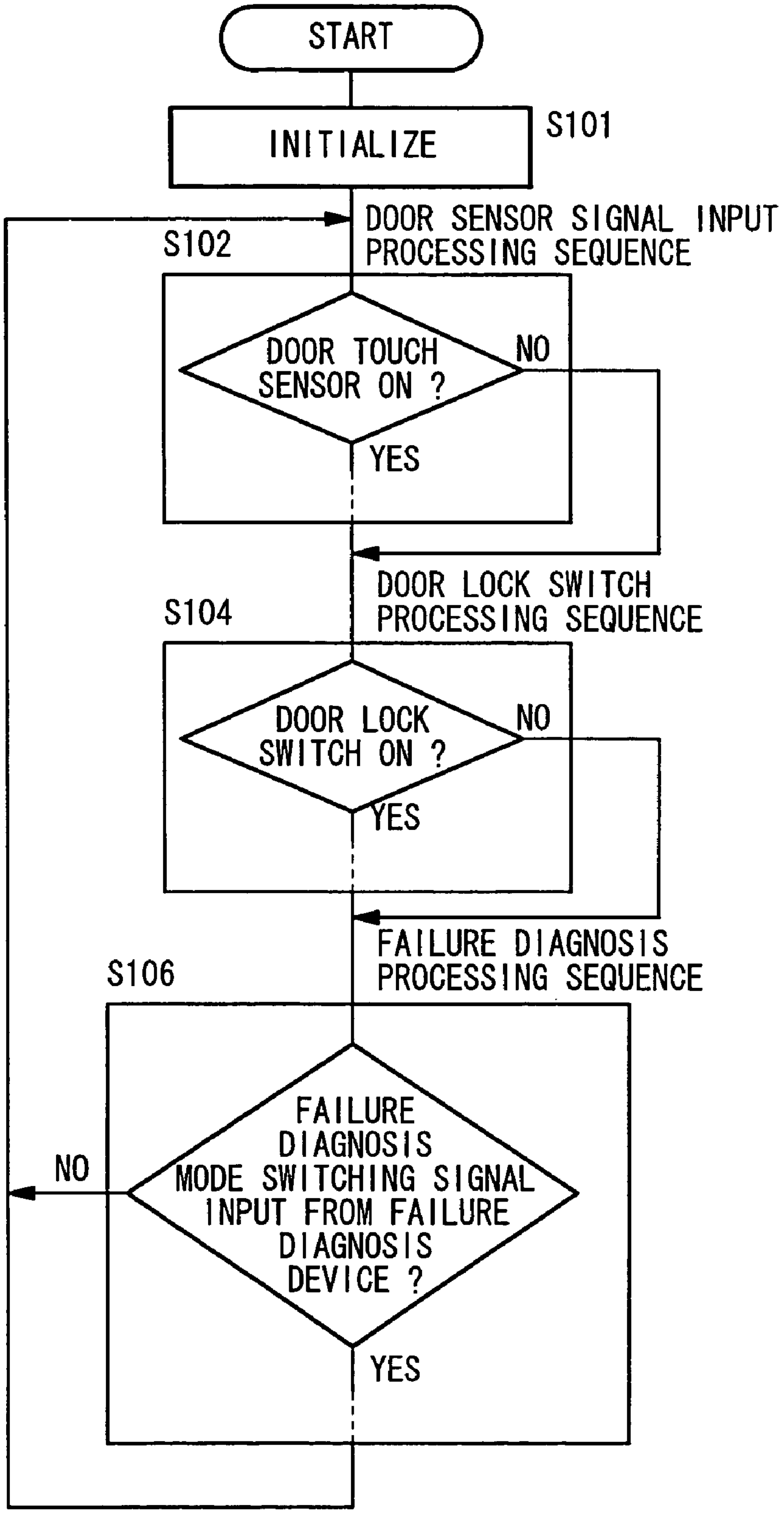
FIG. 3 is a flowchart of a general processing sequence of the vehicular remote control device.

A general processing sequence of the vehicular remote control device 100 will be described below with reference to FIG. 3. When the power supply of the vehicular remote control device 100 is turned on, electric energy is supplied from a vehicle-mounted battery (not shown) to the control unit 16. Under the control of the control unit 16, a program stored in the memory of the control unit 16 starts, initializes a timer, the memory, etc. in step S101, and then performs a door sensor signal input processing sequence in step S102.

In the door sensor signal input processing sequence, it is checked whether the door touch sensor 11 produces an ON output signal or not. If it is judged that the door touch sensor 11 does not produce an ON output signal, then the control skips the door sensor signal input processing sequence and goes to a door lock switch processing sequence in step S104.

If it is judged that the door touch sensor 11 produces an ON output signal in step S102, then the door sensor signal input processing sequence is continuously carried out. After the door sensor signal input processing sequence is finished, the control goes to the door lock switch processing sequence in step S104.

In the door lock switch processing sequence, it is checked whether the door lock switch 12 produces an ON output signal or not. If it is judged that the door lock switch 12 does not produce an ON output signal, then the control skips the door lock switch processing sequence and goes to a failure diagnosis processing sequence in step S106.

If it is judged that the door lock switch 12 produces an ON output signal, then the door lock switch processing sequence is continuously carried out. After the door lock switch processing sequence is finished, control goes to the failure diagnosis processing sequence in step S106.

In the failure diagnosis processing sequence, it is checked whether a failure diagnosis mode switching signal, which indicates the initiation of a failure diagnosis mode, has been input from the failure diagnosis device 41 or not. Subsequently, it is checked whether an antenna designation signal which designates an LF antenna to transmit an LF signal therefrom, has been input from the failure diagnosis device 41 or not. If a failure diagnosis mode switching signal and an antenna designation signal have not been input, then the control goes back to the door sensor signal input processing sequence in step S102.

If it is judged that a failure diagnosis mode switching signal and an antenna designation signal have been input, then the failure diagnosis processing sequence is continuously carried out. After the failure diagnosis processing sequence is finished, the control goes back to the door sensor signal input processing sequence in step S102.

The door sensor signal input processing sequence in step S102 is summarized as follows: When the user or the like who is holding the radio terminal 3 touches the door touch sensor 11 with its hand, the door touch sensor 11 issues an ON output signal, and the intravehicular LF antenna 21*a*, the intravehicular LF antenna 21*b*, the extravehicular LF antenna 22*a*, and the extravehicular LF antenna 22*b* transmit an LF signal. In response to a request signal in the LF signal, the radio terminal 3 transmits an identification signal having a radio frequency. If the control unit 16 detects an agreement between the identification signal from the radio terminal 3 and an identification signal assigned to the vehicle 102, then the control unit 16 controls the RF unit 15 to transmit a cryptographic code signal having a radio frequency. In response to the cryptographic code signal, the radio terminal 3 issues a cryptographic calculation result signal having a radio frequency based on the received cryptographic code signal. When the control unit 16 judges that the cryptographic calculation result signal from the radio terminal 3 agrees with its own cryptographic calculation result signal, the control unit 16 decides that the radio terminal 3 is positioned outside of the vehicle 102, and sends a door unlock command to the door lock actuator 17 to unlock the doors of the vehicle 102.

The door lock switch processing sequence in step S104 is summarized as follows: When the user or the like who is holding the radio terminal. 3 presses the door lock switch 12 with its finger, the door lock switch 12 issues an ON output signal, and the intravehicular LF antenna 21*a*, the intravehicular LF antenna 21*b*, the extravehicular LF antenna 22*a*, and the extravehicular LF antenna 22*b* transmit LF signals. In response to a request signal in the LF signals, the radio terminal 3 transmits an identification signal having a radio frequency. If the control unit 16 detects an agreement between the identification signal from the radio terminal 3 and an identification signal assigned to the vehicle 102, then the control unit 16 controls the RF unit 15 to transmit a cryptographic code signal having a radio frequency. In response to the cryptographic code signal, the radio terminal 3 issues a cryptographic calculation result signal having a radio frequency based on the received cryptographic code signal. When the control unit 16 judges that the cryptographic calculation result signal from the radio terminal 3 agrees with its own cryptographic calculation result signal, the control unit 16 decides that the radio terminal 3 is positioned outside of the vehicle 102, and sends a door lock command to the door lock actuator 17 to lock the doors of the vehicle 102.

The failure diagnosis processing sequence in step S106 will be described later on.

The door sensor signal input processing sequence, which also represents the door lock switch processing sequence because of their similarity, will be described in detail below with reference to FIGS. 4 through 7. Since the door lock switch processing sequence is similar to the door sensor signal input processing sequence, and its process can easily be understood from the door sensor signal input processing sequence, the door lock switch processing sequence will not be described in detail below.

Figure 4:
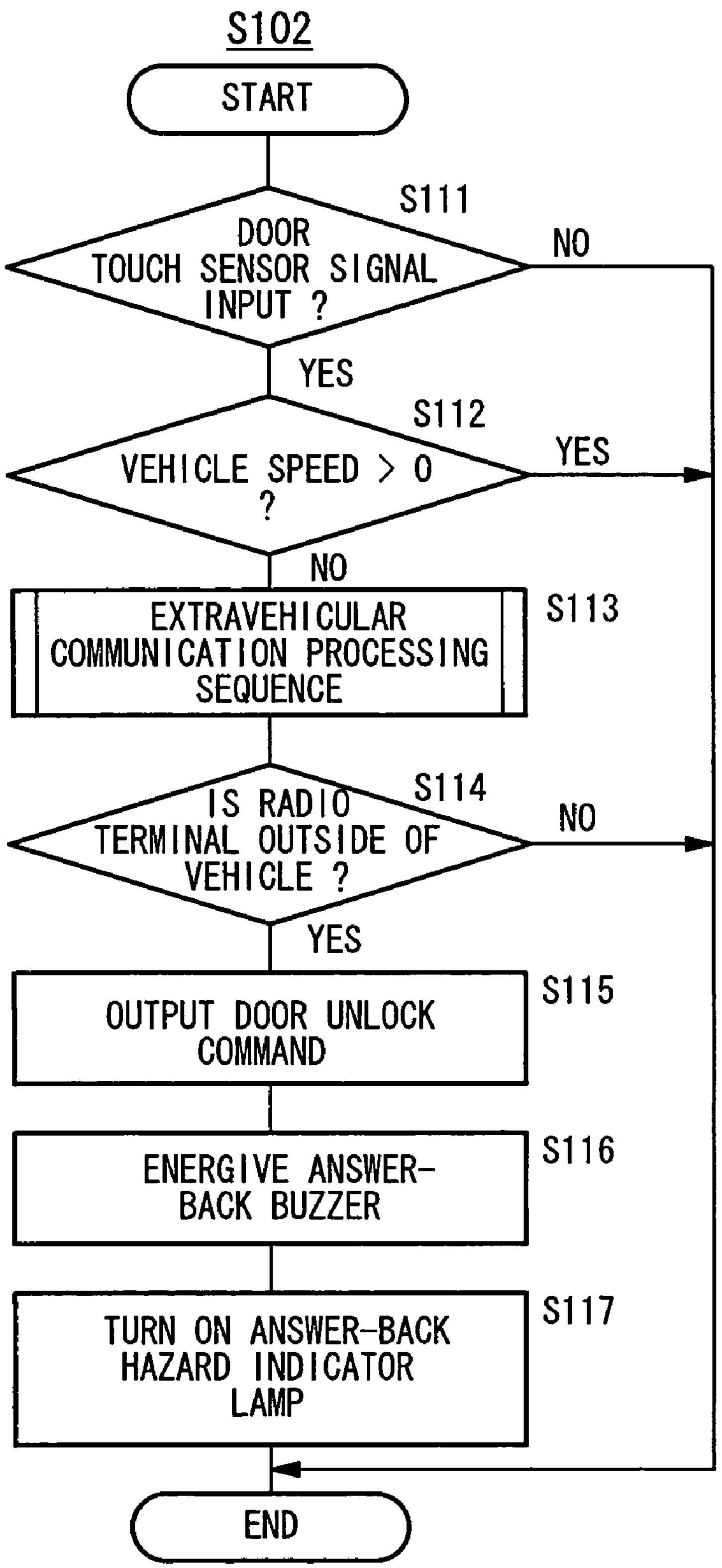
FIG. 4 is a flowchart of a door sensor signal input processing sequence of the vehicular remote control device.

When the door sensor signal input processing sequence in step S102 is started, as shown in FIG. 4, it is checked whether an ON output signal from the door touch sensor 11 is input or not in step S111. If it is judged in step S111 that no ON output signal from the door touch sensor 11 is input, then the door sensor signal input processing sequence is put to an end.

If it is judged in step S111 that no ON output signal from the door touch sensor 11 is input, then it is checked whether the vehicle speed of the vehicle 102 is greater than 0 in step S112. If it is judged in step S112 that the vehicle speed is greater than 0, i.e., if it is judged that the vehicle 102 is running, then the door sensor signal input processing sequence is put to an end.

If it is judged in step S112 that the vehicle speed is not greater than 0, i.e., if it is judged that the vehicle 102 is at rest, then an extravehicular communication processing sequence, to be described later on, which comprises steps S201 through S217 (see FIGS. 5 and 6) as a sequence carried out by the vehicle-mounted unit 1 and steps S301 through S309 (see FIG. 7) as a sequence carried out by the radio terminal 3, is carried out in step S113. Then, it is checked whether the radio terminal 3 is located outside of the vehicle 102 or not in step S114. If it is judged in step S114 that the radio terminal 3 is located inside of the vehicle 102, then the door sensor signal input processing sequence is put to an end.

If it is judged in step S114 that the radio terminal 3 is located outside of the vehicle 102, then a door unlock command is sent to the door lock actuator 17 to unlock the doors in step S115. Then, the answer-back buzzer 26 is energized for a predetermined period of time to indicate that the doors have been unlocked in step S116. Thereafter, the indicator lamp 25 is turned on for answer back for a predetermined period of time to indicate that the doors have been unlocked in step S117. Thereafter, the door sensor signal input processing sequence is ended.

The extravehicular communication processing sequence in step S113 will be described below with reference to FIGS. 5 through 7.

Figure 5:
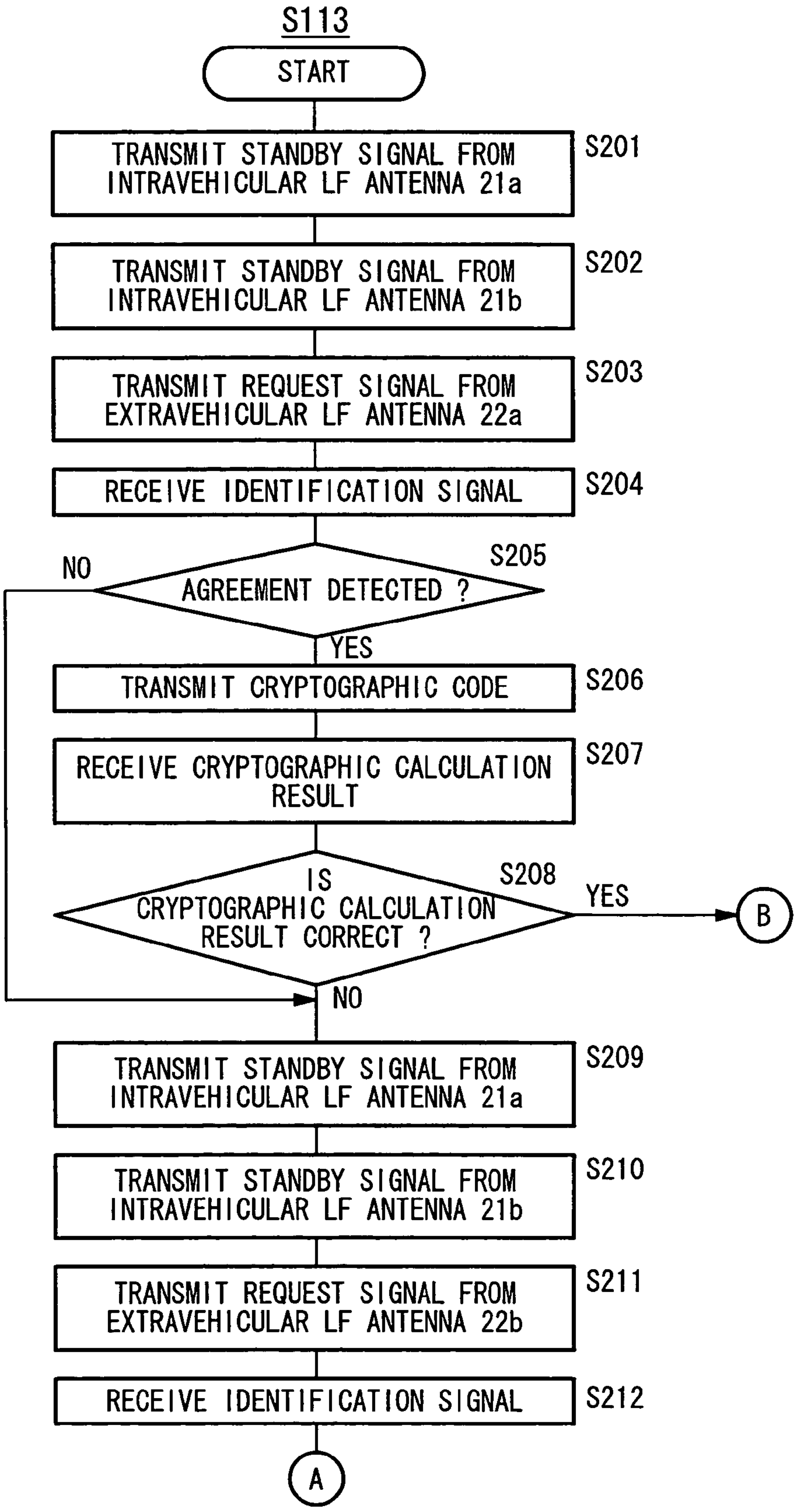
FIGS. 5 and 6 are flowcharts of an extravehicular communication processing sequence on a vehicle side in the door sensor signal input processing sequence of the vehicular remote control device.
Figure 6:
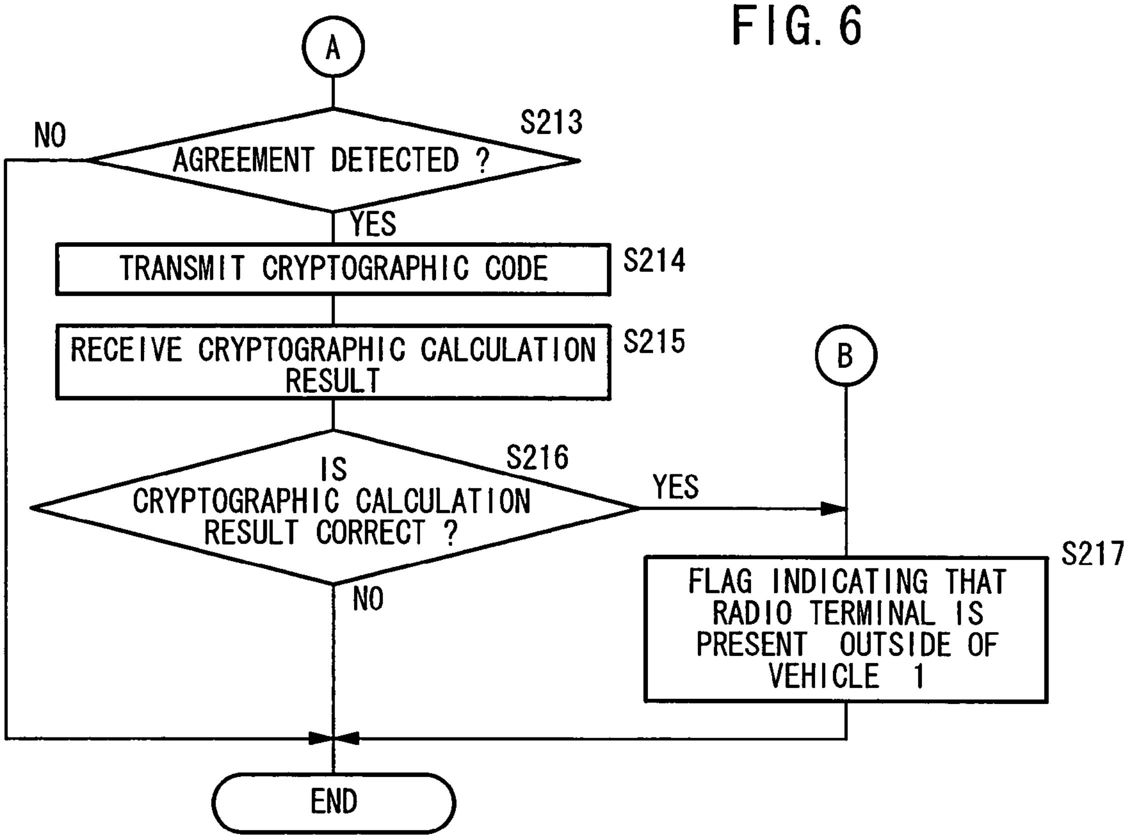

When the extravehicular communication processing sequence is started in step S113, as shown in FIGS. 5 and 6, the intravehicular LF antenna 21*a* transmits a standby signal having a low frequency in step S201. When the transmission of the standby signal from the intravehicular LF antenna 21*a* is finished, the intravehicular LF antenna 21*b* transmits a standby signal having a low frequency in step S202. When the transmission of the standby signal from the intravehicular LF antenna 21*b* is finished, the extravehicular LF antenna 22*a*, which is mounted on the outer vehicle surface at the rear seats of the vehicle 102, transmits an LF request signal in step S203.

The intravehicular LF antennas 21*a*, 21*b* transmits standby signals in order to keep the radio terminal 3 which have received the standby signals, i.e., the radio terminal 3 which is within the vehicle 102, in a standby state for a predetermined period of time to prevent the LF receiver circuit 32 from receiving an LF request signal which will then be transmitted from the extravehicular LF antenna 22*a*.

In response to the request signal transmitted from the extravehicular LF antenna 22*a* in step S203, the radio terminal 3 which is located outside of the vehicle 102 transmits an RF response identification signal through the transmission/reception antenna 33. The transmitted response identification signal is received by the RF unit 15 in step S204. The response identification signal is an identification signal which has been determined in advance in the vehicle 102, but may be an identification signal inherent in the type of the vehicle 102.

It is then checked whether the response identification signal received in step S204 agrees with an identification signal assigned to the vehicle 102 or not in step S205. If it is judged in step S205 that the response identification signal agrees with an identification signal assigned to the vehicle 102, then a cryptographic code (x) which represents a random number, for example, is transmitted from the RF unit 15 in step S206. The cryptographic code (x) comprises a code with a large amount of information represented by a large number of bits. The identification signal may be in the form of a code with a small amount of information represented by a small number of bits.

After step S206, the radio terminal 3 which has received the cryptographic code (x) transmits a cryptographic calculation result (f(x)) signal having a radio frequency. The cryptographic calculation result (f(x)) signal is received by the RF unit 15 in step S207. It is checked whether the received cryptographic calculation result (f(x)) signal agrees with a cryptographic calculation result (f(x)) which is calculated from the cryptographic code (x) transmitted by the RF unit 15 or not, thereby checking whether the received cryptographic calculation result (f(x)) is correct or not in step S208.

The control unit 16 stores a cryptographic calculation formula for the cryptographic code (x), and hence allows the cryptographic calculation result (f(x)) to be calculated from the cryptographic code (x) in the vehicle-mounted unit 1 for making the decision in step S208.

If it is judged that cryptographic calculation result (f(x)) is correct in step S208, then a flag indicating that the radio terminal 3 is located outside of the vehicle 102 is set in step S217, after which the extravehicular communication processing sequence carried out by the vehicle-mounted unit 1 is put to an end.

If it is judged that cryptographic calculation result (f(x)) is not correct in step S208, then the intravehicular LF antenna 21*a* transmits a standby signal having a low frequency in step S209. When the transmission of the standby signal from the intravehicular LF antenna 21*a* is finished, the intravehicular LF antenna 21*b* transmits a standby signal having a low frequency in step S210. When the transmission of the standby signal from the intravehicular LF antenna 21*b* is finished, the extravehicular LF antenna 22*b*, which is mounted on the reverse side of the rearview door mirror of the vehicle 102, transmits a request signal having a low frequency in step S211.

If it is judged in step S205 that the response identification signal does not agree with an identification signal assigned to the vehicle 102, then control jumps from step S205 to step S209.

The radio terminal 3 which has received the request signal transmitted in step S211 transmits an RF response identification signal, which is received by the RF unit 15 in step S212.

It is then checked whether the response identification signal received in step S212 agrees with the identification signal assigned to the vehicle 102 or not in step S213. If it is judged in step S213 that the response identification signal agrees with the identification signal assigned to the vehicle 102, then a cryptographic code (x) is transmitted from the RF unit 15 in step S214.

After step S214, the radio terminal 3 which has received the cryptographic code (x) transmits a cryptographic calculation result (f(x)) signal having a radio frequency. The cryptographic calculation result (f(x)) signal is received by the RF unit 15 in step S215. It is checked whether the received cryptographic calculation result (f(x)) signal agrees with a cryptographic calculation result (f(x)) which is calculated from the cryptographic code (x) transmitted by the RF unit 15 or not, thereby checking whether the received cryptographic calculation result (f(x)) is correct or not in step S216.

If it is judged that cryptographic calculation result (f(x)) is correct in step S216, then the flag indicating that the radio terminal 3 is located outside of the vehicle 102 is set in step S217, after which the extravehicular communication processing sequence carried out by the vehicle-mounted unit 1 is put to an end.

If it is judged in step S213 that the response identification signal does not agree with the identification signal assigned to the vehicle 102, then the extravehicular communication processing sequence carried out by the vehicle-mounted unit 1 is put to an end. If it is judged in step S216 that cryptographic calculation result (f(x)) is not correct in step S216, then the extravehicular communication processing sequence carried out by the vehicle-mounted unit 1 is put to an end.

In step S211, the request signal is transmitted from the extravehicular LF antenna 22*b*, rather than from the extravehicular LF antenna 22*a* as in step S203, in order to cover all the range outside of the vehicle 102 where the radio terminal 3 may possibly be located when the person who possesses the radio terminal 3 locks or unlocks the doors in the effective transmission ranges of the extravehicular LF antennas 22*a*, 22*b*.

Figure 7:
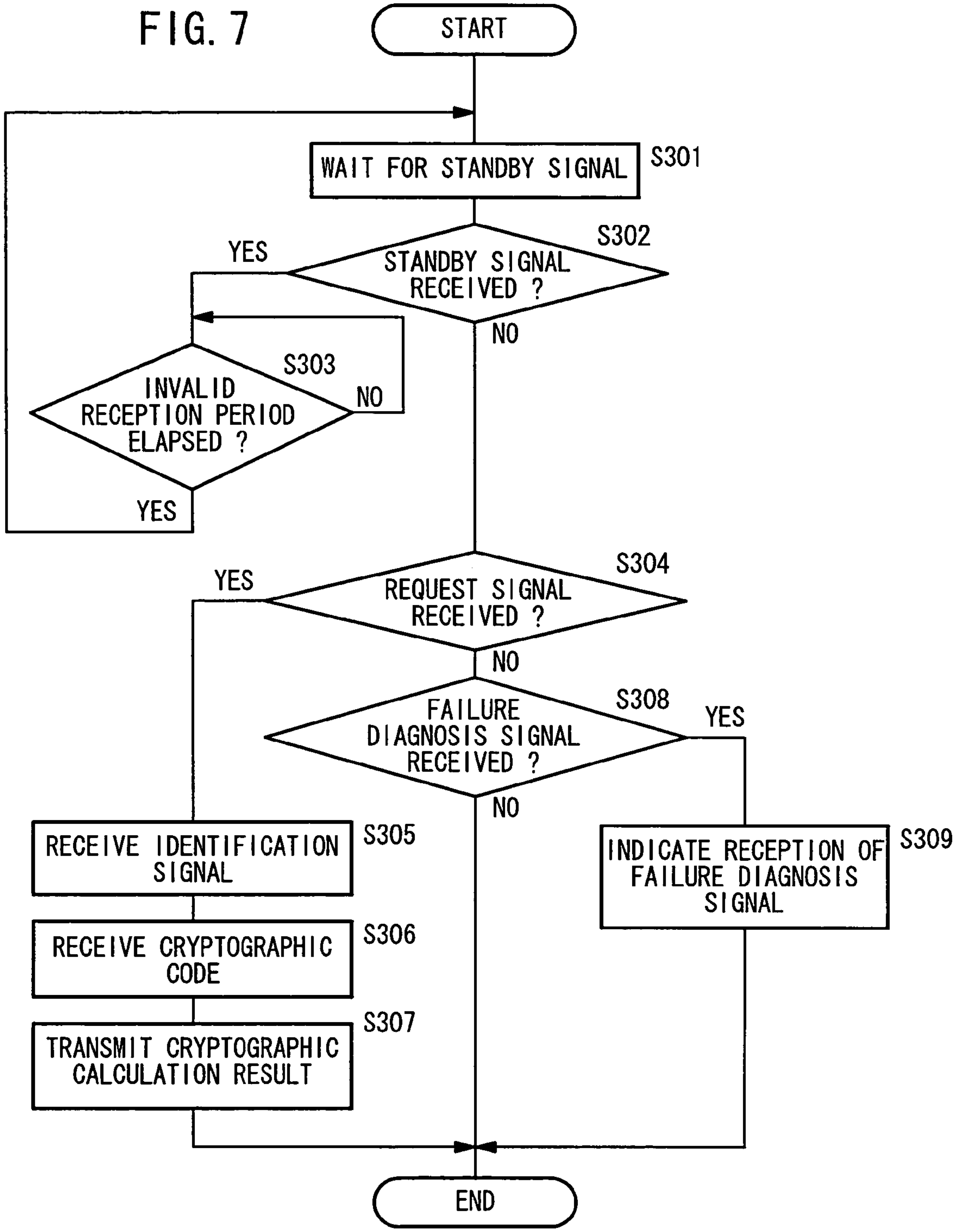
FIG. 7 is a flowchart of an extravehicular communication processing sequence on a radio terminal side in the door sensor signal input processing sequence of the vehicular remote control device.

While the above extravehicular communication processing sequence is being carried out by the vehicle-mounted unit 1, the extravehicular communication processing sequence is carried out by the radio terminal 3 as shown in FIG. 7. Specifically, the radio terminal 3 waits in a reception standby state for a standby signal to be transmitted from the vehicle-mounted unit 1 in step S301. Then, it is checked whether a standby signal is received or not in step S302. If it is judged in step S302 that a standby signal is received, then the radio terminal 3 waits for a invalid reception period to elapse in step S303. Upon elapse of the invalid reception period, the control goes to step S301.

If it is judged in step S302 that a standby signal is not received, then it is checked whether a request signal is received or not in step S304. If it is judged in step S304 that a request signal is received, then an identification signal is transmitted to the vehicle-mounted unit 1 in step S305. Then, a cryptographic code (x) transmitted from the vehicle-mounted unit 1 is received in step S306. Then, a cryptographic calculation result (f(x)) signal representing a cryptographic calculation result (f(x)) which is calculated from the received cryptographic code (x) is transmitted to the vehicle-mounted unit 1 in step S307. Thereafter, the extravehicular communication processing sequence carried out by the radio terminal 3 is put to an end.

When request signals are transmitted in the corresponding steps of the door sensor signal input processing sequence in step S102, the reception of a failure diagnosis mode switching signal, which indicates the initiation of a failure diagnosis mode, and an antenna designation signal, which designates either one of the LF antennas 21*a*, 21*b*, 22*a*, 22*b* to transmit an LF signal therefrom, is not checked in step S308, and is not indicated in step S309.

While the door sensor signal input processing sequence in step S102 has been described in detail above, the door lock switch processing sequence in step S104 is essentially the same as the door sensor signal input processing sequence and its process can readily be understood the above description of the door sensor signal input processing sequence. In the door lock switch processing sequence, steps S308, S309 are not carried out.

The failure diagnosis processing sequence in step S106 will be described in detail below with reference to FIGS. 8, 9, and 7.

Figure 8:
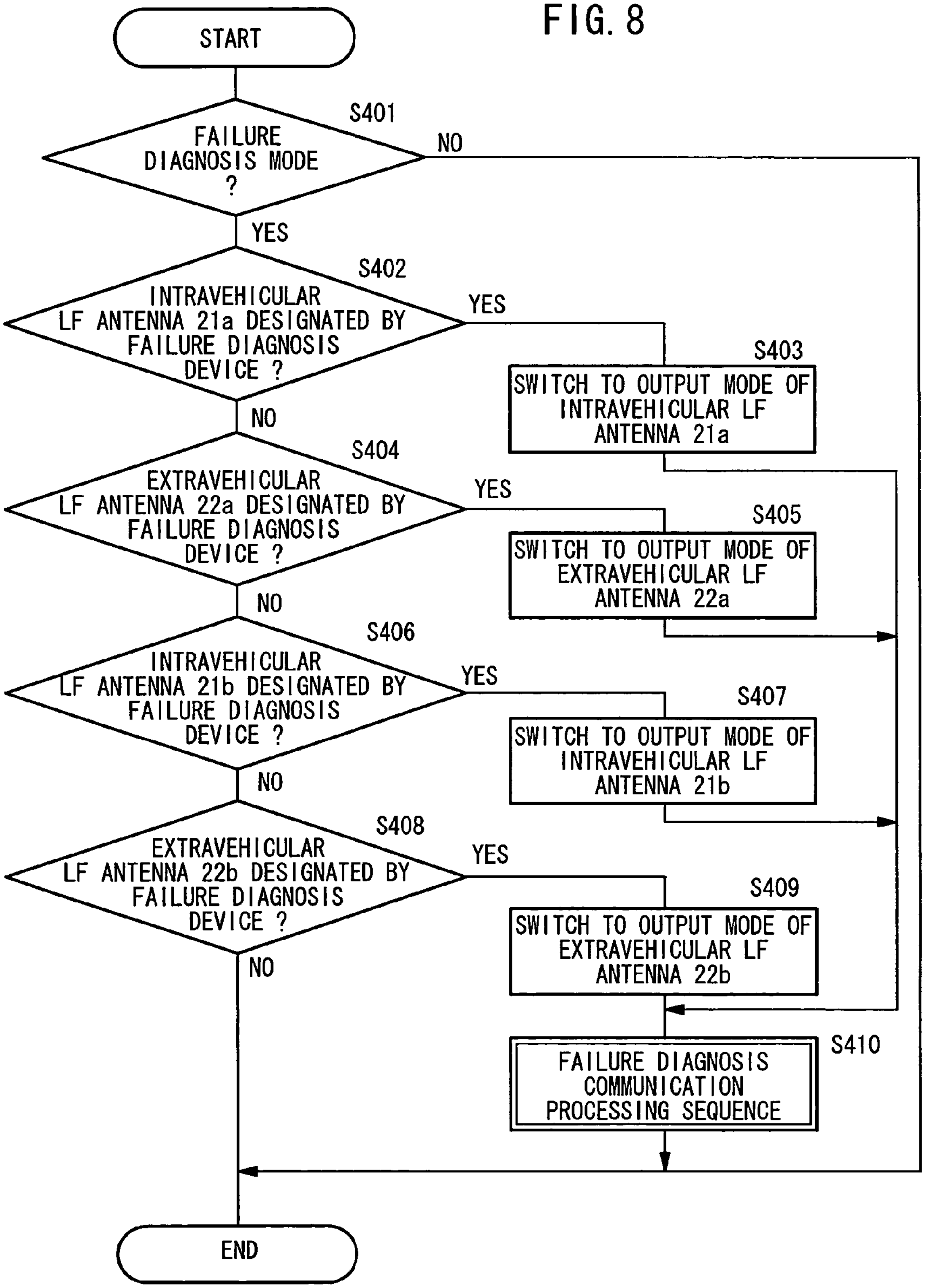
FIG. 8 is a flowchart of a failure diagnosis processing sequence of the vehicular remote control device.

As shown in FIG. 8, it is checked in step S401 whether a failure diagnosis mode switching signal, which indicates the initiation of a failure diagnosis mode, has been input from the failure diagnosis device 41 or not. Subsequently, it is checked whether an antenna designation signal, which designates either one of the LF antennas 21*a*, 21*b*, 22*a*, 22*b* to transmit an LF signal therefrom, has been input from the failure diagnosis device 41 or not. If the failure diagnosis device 41 is not connected to the control unit 16 by the connector 42, or if the failure diagnosis device 41 is connected to the control unit 16, but a failure diagnosis mode switching signal and an antenna designation signal which designates either one of the LF antennas 21*a*, 21*b*, 22*a*, 22*b* to transmit an LF signal therefrom are not sent from the failure diagnosis device 41, then the failure diagnosis processing sequence is not performed.

If it is judged in step S401 that a failure diagnosis mode switching signal and an antenna designation signal which designates either one of the LF antennas 21*a*, 21*b*, 22*a*, 22*b* to transmit an LF signal therefrom, have been input from the failure diagnosis device 41, then it is checked in step S402 whether the intravehicular LF antenna 21*a* is designated by the antenna designation signal from the failure diagnosis device 41 or not. If it is judged in step S402 that the intravehicular LF antenna 21*a* is designated, then information indicating that the intravehicular LF antenna 21*a* is designated is stored as a variable in the memory in the control unit 16, thus changing the data stored in the memory to an output mode of the intravehicular LF antenna 21*a* in step S403.

Figure 9:
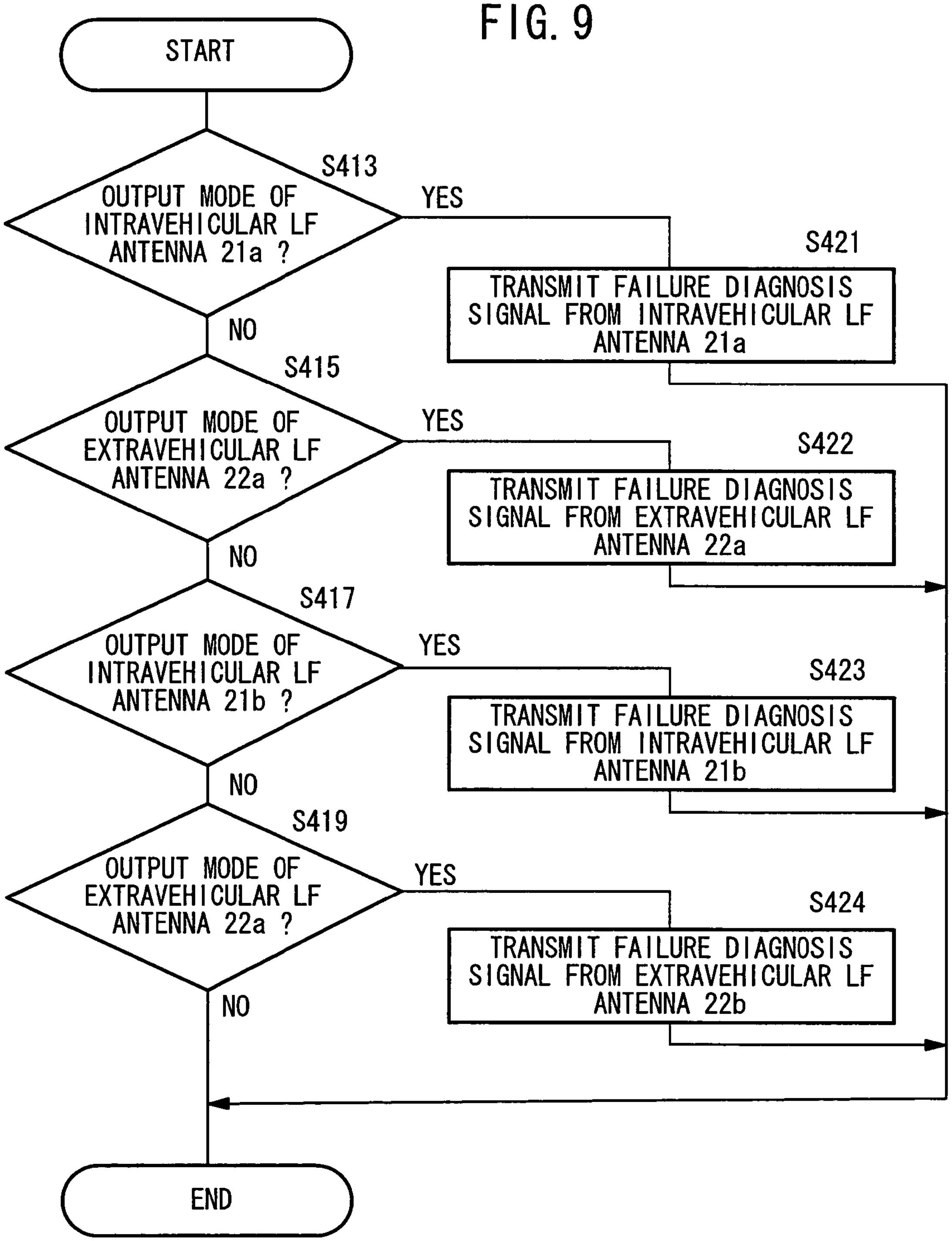
FIG. 9 is a flowchart of a failure diagnosis communication processing sequence in the failure diagnosis processing sequence of the vehicular remote control device.

After step S403, a failure diagnosis communication processing sequence is carried out based on communications between the vehicle-mounted unit 1 and the radio terminal 3 as shown in FIGS. 9 and 7 in step S410. Thereafter, the failure diagnosis processing sequence is put to an end.

If it is judged in step S402 that the intravehicular LF antenna 21*a* is not designated, then it is checked in step S404 whether the extravehicular LF antenna 22*a* is designated by the antenna designation signal from the failure diagnosis device 41 or not. If it is judged in step S404 that the extravehicular LF antenna 22*a* is designated, then information indicating that the extravehicular LF antenna 22*a* is designated is stored as a variable in the memory in the control unit 16, thus changing the data stored in the memory to an output mode of the extravehicular LF antenna 22*a* in step S405.

After step S405, the failure diagnosis communication processing sequence is carried out based on communications between the vehicle-mounted unit 1 and the radio terminal 3 as shown in FIGS. 9 and 7 in step S410. Thereafter, the failure diagnosis processing sequence is put to an end.

If it is judged in step S404 that the extravehicular LF antenna 22*a* is not designated, then it is checked in step S406 whether the intravehicular LF antenna 21*b* is designated by the antenna designation signal from the failure diagnosis device 41 or not. If it is judged in step S406 that the intravehicular LF antenna 21*b* is designated, then information indicating that the intravehicular LF antenna 21*b* is designated is stored as a variable in the memory in the control unit 16, thus changing the data stored in the memory to an output mode of the intravehicular LF antenna 21*b* in step S407.

After step S407, the failure diagnosis communication processing sequence is carried out based on communications between the vehicle-mounted unit 1 and the radio terminal 3 as shown in FIGS. 9 and 7 in step S410. Thereafter, the failure diagnosis processing sequence is put to an end.

If it is judged in step S406 that the intravehicular LF antenna 21*b* is not designated, then it is finally checked in step S408 whether the extravehicular LF antenna 22*b* is designated by the antenna designation signal from the failure diagnosis device 41 or not. If it is judged in step S408 that the extravehicular LF antenna 22*b* is designated, then information indicating that the extravehicular LF antenna 22*b* is designated is stored as a variable in the memory in the control unit 16, thus changing the data stored in the memory to an output mode of the extravehicular LF antenna 22*b* in step S409.

After step S409, the failure diagnosis communication processing sequence is carried out based on communications between the vehicle-mounted unit 1 and the radio terminal 3 as shown in FIGS. 9 and 7 in step S410. Thereafter, the failure diagnosis processing sequence is put to an end.

If it is judged in step S408 that the extravehicular LF antenna 22*b* is not designated, then the failure diagnosis processing sequence is put to an end.

It has been illustrated above that the failure diagnosis mode switching signal, which indicates the initiation of a failure diagnosis mode, and then the antenna designation signal, which designates either one of the LF antennas 21*a*, 21*b*, 22*a*, 22*b* to transmit an LF signal therefrom, are transmitted from the failure diagnosis device 41. However, if any one of the LF antennas 21*a*, 21*b*, 22*a*, 22*b* is not designated in steps S402, S404, S406, S408, then the steps next to these steps are carried out and then the failure diagnosis processing sequence is put to an end. Therefore, the failure diagnosis mode switching signal may be omitted, and hence step S401 may be omitted.

When the failure diagnosis communication processing sequence based on communications between the vehicle-mounted unit 1 and the radio terminal 3 is initiated in step S410, it is checked in step S413 shown in FIG. 9 whether the output mode of the intravehicular LF antenna 21*a* is set in the memory in the control unit 16 or not. If it is judged in step S413 that the output mode of the intravehicular LF antenna 21*a* is set, then the system of the intravehicular LF antenna 21*a* transmits a failure diagnosis signal to the radio terminal 3 in step S421. The system of the intravehicular LF antenna 21*a* includes the LF transmitter circuit 23*a* in addition to the intravehicular LF antenna 21*a*.

If it is judged in step S413 that the output mode of the intravehicular LF antenna 21*a* is not set, then it is checked in step S415 whether the output mode of the extravehicular LF antenna 22*a* is set in the memory in the control unit 16 or not. If it is judged in step S415 that the output mode of the extravehicular LF antenna 22*a* is set, then the system of the extravehicular LF antenna 22*a* transmits a failure diagnosis signal to the radio terminal 3 in step S422. The system of the extravehicular LF antenna 22*a* includes the LF transmitter circuit 24*a* in addition to the extravehicular LF antenna 22*a*.

If it is judged in step S415 that the output mode of the extravehicular LF antenna 22*a* is not set, then it is checked in step S417 whether the output mode of the intravehicular LF antenna 21*b* is set in the memory in the control unit 16 or not. If it is judged in step S417 that the output mode of the intravehicular LF antenna 21*b* is set, then the system of the intravehicular LF antenna 21*b* transmits a failure diagnosis signal to the radio terminal 3 in step S423. The system of the intravehicular LF antenna 21*b* includes the LF transmitter circuit 23*b* in addition to the intravehicular LF antenna 21*b*.

If it is judged in step S417 that the output mode of the intravehicular LF antenna 21*b* is not set, then it is checked in step S419 whether the output mode of the extravehicular LF antenna 22*b* is set in the memory in the control unit 16 or not. If it is judged in step S419 that the output mode of the extravehicular LF antenna 22*b* is set, then the system of the extravehicular LF antenna 22*b* transmits a failure diagnosis signal to the radio terminal 3 in step S424. The system of the extravehicular LF antenna 22*b* includes the LF transmitter circuit 24*b* in addition to the extravehicular LF antenna 22*b*.

If it is judged in step S419 that the output mode of the extravehicular LF antenna 22*b* is not set, then the failure diagnosis communication processing sequence is put to an end.

In steps S421, S422, S423, S424, the failure diagnosis signal may be transmitted repeatedly a predetermined number of times, or may be transmitted continuously until a diagnosis end signal is input.

The radio terminal 3 which has received the failure diagnosis signal that is transmitted in steps S421, S422, S423, S424 goes through steps S301, S302, S304 shown in FIG. 7 as the received signal is neither the standby signal nor the request signal, and checks whether the failure diagnosis signal is received or not in step S308. In step S308, it is judged that the failure diagnosis signal is received. In step S309, the LED 36 of the radio terminal 3 is turned on, indicating the reception of the failure diagnosis signal.

Since steps S305 through S307 shown in FIG. 7 are not carried out, the RF transmitter/receiver circuit 34, which consumes electric power in the radio terminal 3, is not required to be energized. Therefore, the power consumption of the radio terminal 3 may be reduced, and hence the primary battery 37 is less consumed, and its service life is prolonged.

If it is judged in step S308 shown in FIG. 7 that the failure diagnosis signal is not received, then the failure diagnosis mode is put to an end.

A process of diagnosing the vehicular remote control device 100 for failures using the failure diagnosis device 41 will be described below.

When the failure diagnosis device 41 transmits a failure diagnosis mode switching signal and an antenna designation signal which designates either one of the LF antennas 21*a*, 21*b*, 22*a*, 22*b* to transmit an LF signal therefrom, the designated one of the LF antennas 21*a*, 21*b*, 22*a*, 22*b* is switched to the output mode, and the LF antenna switched to the output mode transmits a failure diagnosis signal.

The failure diagnosis signal transmitted from the designated LF antenna of the vehicle-mounted unit 1 is received by the LF receiver circuit 32 through the LF antenna 31 of the radio terminal 3. The reception of the failure diagnosis signal through the LF antenna 31 is detected by the control unit 35, which turns on the LED 36. Since the LED 36 is provided on the radio terminal 3, the user of the radio terminal 3 can confirm whether a failure has occurred or not at hand.

If the LED 36 is energized in the failure diagnosis mode, then the designated LF antenna of the vehicle-mounted unit 1, the LF transmitter circuit connected to the designated LF antenna, the LF antenna 31 of the radio terminal 3, and the LF receiver circuit 32 connected to the LF antenna 31 are judged as being normal.

Conversely, if the LED 36 is not energized in the failure diagnosis mode, then either one of the designated LF antenna of the vehicle-mounted unit 1, the LF transmitter circuit connected to the designated LF antenna, the LF antenna 31 of the radio terminal 3, and the LF receiver circuit 32 connected to the LF antenna 31 is judged as suffering a failure. However, it cannot be confirmed as to which one of these antennas and circuits is malfunctioning. Therefore, the above failure diagnosis mode is carried out using another radio terminal 3 which is functioning normally.

If the LED 36 on the other radio terminal 3 is energized, then it can be recognized that the LF antenna 31 or the LF receiver circuit 32 of the radio terminal 3 used in the preceding failure diagnosis mode, and the designated LF antenna of the vehicle-mounted unit 1 and the LF transmitter circuit connected to the designated LF antenna are not malfunctioning.

If the LED 36 on the other radio terminal 3 is not energized, then it can be recognized that the designated LF antenna of the vehicle-mounted unit 1 or the LF transmitter circuit connected to the designated LF antenna is malfunctioning. In this manner, it can readily be determined whether the designated LF antenna of the vehicle-mounted unit 1 or the LF transmitter circuit connected to the designated LF antenna is malfunctioning, or the LF antenna 31 or the LF receiver circuit 32 of the radio terminal 3 is malfunctioning.

The above failure diagnosis mode is carried out by designating all the LF antennas 21*a*, 21*b*, 22*a*, 22*b* of the vehicle-mounted unit 1, for thereby diagnosing, for failures, all the LF antennas 21*a*, 21*b*, 22*a*, 22*b*, the LF transmitter circuits 23*a*, 23*b*, 24*a*, 24*b* connected respectively to the LF antennas 21*a*, 21*b*, 22*a*, 22*b*, the LF antenna 31, and the LF receiver circuit 32.

If the user feels that the effective transmission ranges 121*a*, 121*b*, 122*a*, 122*b* of the intravehicular LF antennas 21*a*, 21*b* and the extravehicular LF antennas 22*a*, 22*b* of the vehicle-mounted unit 1 have been reduced, then the above failure diagnosis mode is carried out to confirm the energization of the LED 36. Then, the radio terminal 3 is moved toward or away from the LF antennas 21*a*, 21*b*, 22*a*, 22*b*, and the distances between the radio terminal 3 and the centers of the LF antennas 21*a*, 21*b*, 22*a*, 22*b* are measured at the time the LED 36 is de-energized. Each of the measured distances is compared with a reference distance to determine whether each of the effective transmission ranges 121*a*, 121*b*, 122*a*, 122*b* is normal or not based on whether the measured distance is smaller than the reference distance.

As described above, when the vehicular remote control device 100 is diagnosed for failures, identification signals and cryptographic codes are not judged for agreement based on an exchange of RF signals between the RF unit 15 of the vehicle-mounted unit 1 and the RF transmitter/receiver circuit 34 of the radio terminal 3, and have nothing to do with the failure diagnosis mode. Therefore, identification signals and cryptographic codes of the radio terminal 3 and the vehicle-mounted unit 1 which are used for a failure diagnosis do not have to be in agreement. Consequently, a failure diagnosis can easily be performed by not only a radio terminal 3 which has identification information that matches the identification information stored in the vehicle-mounted unit 1, but also any radio terminals 3. Because identification signals and cryptographic codes are not judged for agreement for a failure diagnosis, it is not necessary to operate the RF transmitter/receiver circuit 34 of the radio terminal 3 in the failure diagnosis mode. Since there is no need for operating the RF transmitter/receiver circuit 34 which requires a large power consumption in the failure diagnosis mode, the power consumption of the primary battery 37 may be small.

Furthermore, a failure diagnosis is carried out based on unidirectional communications from the vehicle 102 to the radio terminal 3, rather than on bidirectional communications between the vehicle 102 and the radio terminal 3 using a request signal and a response signal. Therefore, spots diagnosed for failures are narrowed down, making it easy to specify the location of a failure.

Figure 10:
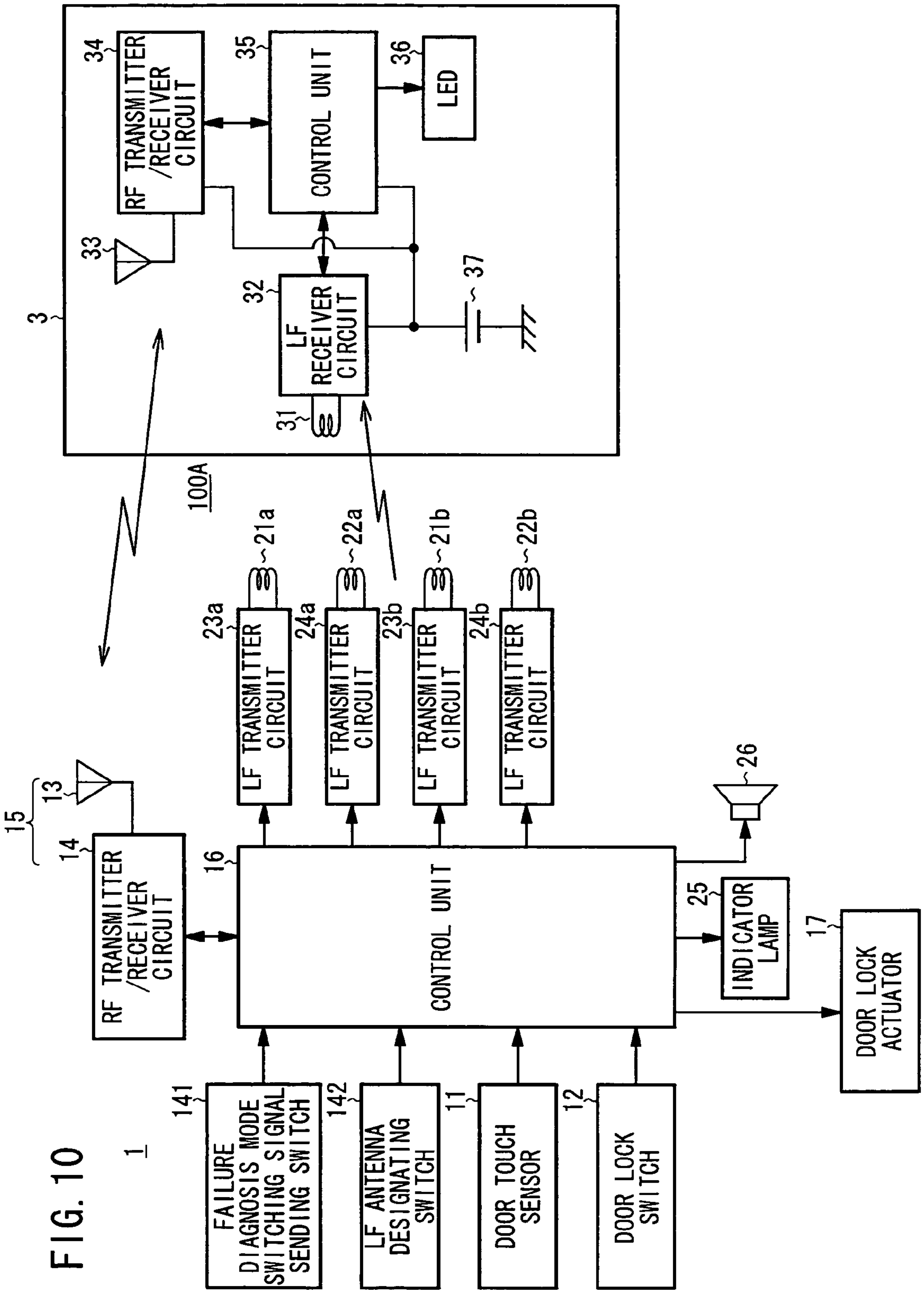
FIG. 10 is a block diagram of a vehicular remote control device according to another embodiment of the present invention.

It has been illustrated in the above embodiment that the failure diagnosis device 41 is used to diagnose the vehicular remote control device 100 for failures. According to another embodiment of the present invention, as shown in FIG. 10, a vehicular remote control device 100A has a failure diagnosis mode switching signal sending switch 141 as a failure diagnosis mode switching signal sending switch means, and an LF antenna designating switch 142 as an LF antenna designating switch means for sending a failure diagnosis signal to an LF antenna. The failure diagnosis mode switching signal sending switch 141 and the LF antenna designating switch 142 are disposed independently, as an alternative to the failure diagnosis device 41, in the vehicle-mounted unit 1. When in the failure diagnosis mode, a failure diagnosis may be performed on the vehicular remote control device 100A through a designated LF antenna and an LF transmitter circuit connected thereto, using the failure diagnosis mode switching signal sending switch 141 and the LF antenna designating switch 142.

The failure diagnosis mode switching signal sending switch 141 and the LF antenna designating switch 142 correspond to a failure diagnosis means disposed in the vehicle 102 for diagnosing the vehicular transmitter for failures.

Alternatively, a failure diagnosis means disposed in the vehicle 102 may comprise a plurality of switches, which usually are not simultaneously operated for vehicular remote control, for sending a failure diagnosis mode switching signal when simultaneously operated, and a plurality of switches, which usually are not simultaneously operated, for sending a failure diagnosis signal to an LF antenna for a failure diagnosis when simultaneously operated.

In the above alternative, the failure diagnosis signal may be used only as an antenna designating signal for designating an LF antenna to transmit an LF signal therefrom.

As described above, since the vehicular remote control device according to the present invention does not perform a failure diagnosis by comparing the level of a signal, there is no risks in causing diagnostic errors due to noise, the power consumption of the portable unit can be reduced, and the location of a failure can easily be specified.

Although certain preferred embodiments of the present invention have been shown and described in detail, it should be understood that various changes and modifications may be made therein without departing from the scope of the appended claims.

What is claimed is:

1. A vehicular remote control device comprising:

vehicular transmitter for transmitting a request signal;

a portable unit for transmitting a response signal in response to the request signal transmitted thereto from said vehicular transmitter;

vehicular receiver for receiving said response signal; and control means for determining whether the response signal received by said vehicular receiver matches identification information stored in a vehicle or not, and controlling an operating state of a vehicle-mounted device depending on the determined result;

said portable unit having indicating means for indicating a failure status and decision means for determining the reception of a failure diagnosis signal transmitted to said portable unit instead of said request signal, wherein said indicating means is operated and transmission of said response signal is prohibited when said decision means determines the reception of the failure diagnosis signal.

2. A vehicular remote control device according to claim 1, wherein said indicating means comprises an LED, said failure diagnosis signal functioning as a command signal for energizing said LED.

3. A vehicular remote control device according to claim 1, wherein said vehicle-mounted device comprises a door lock.

4. A vehicular remote control device according to claim 1, wherein said failure diagnosis signal to be transmitted to said portable unit comprises a common signal used in any types of vehicles.

5. A vehicular remote control device comprising:

vehicular transmitter for transmitting a request signal;

a portable unit for transmitting a response signal in response to the request signal transmitted thereto from said vehicular transmitter;

vehicular receiver for receiving said response signal;

control means for determining whether the response signal received by said vehicular receiver matches identification information stored in a vehicle or not, and controlling an operating state of a vehicle-mounted device depending on the determined result; and failure diagnosis means disposed in said vehicle for controlling said portable unit to diagnose said vehicular transmitter for failures by means of transmitting a failure diagnosis signal instead of the request signal from said vehicular transmitter;

said portable unit having indicating means for indicating a failure status and means for operating said indicating means while prohibiting transmission of said response signal in response to said failure diagnosis signal.

6. A vehicular remote control device according to claim 5, wherein said indicating means comprises an LED, said failure diagnosis signal functioning as a command signal for energizing said LED.

7. A vehicular remote control device according to claim 5, wherein said vehicle-mounted device comprises a door lock.

8. A vehicular remote control device according to claim 5, wherein said failure diagnosis signal to be transmitted to said portable unit comprises a common signal used in any types of vehicles.

9. A portable unit for use in a vehicular remote control device, comprising:

an LF receiver circuit for receiving a request signal having a low frequency which is transmitted from a vehicle;

an RF transmitter circuit responsive to said request signal, for transmitting a response signal having a radio frequency which includes identification information for controlling an operating state of a vehicle-mounted device on said vehicle;

decision means for determining whether a failure diagnosis signal having a low frequency which is transmitted instead of said request signal is received by said LF receiver circuit or not; and indicating means for indicating a failure status, wherein said decision means operates said indicating means when it is judged by said decision means that said failure diagnosis signal is received by said LF receiver circuit.

10. A portable unit according to claim 9, wherein said indicating means comprises an LED, said failure diagnosis signal functioning as a command signal for energizing said LED.

11. A portable unit according to claim 9, wherein said vehicle-mounted device comprises a door lock.

12. A portable unit according to claim 9, wherein said failure diagnosis signal to be transmitted to said portable unit comprises a common signal used in any type of vehicle.

* * * * *